United States Patent
Kuroda et al.

(10) Patent No.: US 8,827,342 B2
(45) Date of Patent: Sep. 9, 2014

(54) VEHICLE PACKAGE TRAY

(75) Inventors: Atsushi Kuroda, Kasugai (JP);
Hiroyuki Seto, Kasugai (JP)

(73) Assignee: Howa Textile Industry Co., Ltd,
Aichi-ken (JP)

( * ) Notice: Subject to any disclaimer, the term of this patent is extended or adjusted under 35 U.S.C. 154(b) by 0 days.

(21) Appl. No.: 13/825,164

(22) PCT Filed: Jul. 3, 2012

(86) PCT No.: PCT/JP2012/067002
§ 371 (c)(1),
(2), (4) Date: Apr. 11, 2013

(87) PCT Pub. No.: WO2013/005744
PCT Pub. Date: Jan. 10, 2013

(65) Prior Publication Data
US 2014/0110963 A1    Apr. 24, 2014

(30) Foreign Application Priority Data
Jul. 5, 2011   (JP) ................................. 2011-149239

(51) Int. Cl.
*B60R 7/04*    (2006.01)
*B60R 5/04*    (2006.01)
*B60R 13/08*   (2006.01)

(52) U.S. Cl.
CPC .................................. *B60R 13/08* (2013.01);
*B60R 5/044* (2013.01)
USPC ....................................................... 296/37.16

(58) Field of Classification Search
USPC ............................. 296/39.3, 37.16
See application file for complete search history.

(56) References Cited

U.S. PATENT DOCUMENTS

| 5,076,631 | A  | * | 12/1991 | Lord, Jr. ....................... 296/37.8 |
| 5,813,715 | A  | * | 9/1998  | Musukula et al. .............. 296/63 |
| 7,396,063 | B2 | * | 7/2008  | Warsi et al. ................ 296/24.44 |
| 2007/0096511 | A1 | * | 5/2007  | Warsi et al. .............. 297/188.04 |

FOREIGN PATENT DOCUMENTS

| JP | 07089395 | 4/1995 |
| JP | 2002210856 | 7/2002 |
| JP | 2006015857 | 1/2006 |
| JP | 2006160197 | 6/2006 |
| JP | 2009035101 | 2/2009 |

OTHER PUBLICATIONS

International Search Report and Written Opinion dated Sep. 24, 2012 for International Application No. PCT/JP2012/067002 (8 pgs.).

* cited by examiner

*Primary Examiner* — Lori Lyjak
(74) *Attorney, Agent, or Firm* — Timothy S. Westby; Porter Hedges, LLP

(57) ABSTRACT

In a vehicle package tray (100) disposed in the back of a rear seat of a vehicle, a sheet-shaped glass fiber mats (108), in which urethane resin (110) is impregnated, are overlapped on both surfaces of a semi-hard urethane foam layer (102), a front surface material (104) is overlapped on the surface of one glass fiber mat (108), in which the urethane resin (110) is impregnated, via a first adhesive film (106), back material (114) is overlapped on the surface of the other glass fiber mat (108), in which the urethane resin (110) is impregnated, via a second adhesive film (112), and the multi-overlapped object obtains a sound absorbing performance by being formed into a three-dimensional shape by being pinched and fixed by a press die, heated, pressurized, and thereby fused.

5 Claims, 5 Drawing Sheets

VEHICLE PACKAGE TRAY

TECHNICAL FIELD

The present invention relates to a vehicle package tray.

BACKGROUND ART

In recent years, a vehicle interior has been required to be more silent, and various kinds of means for suppressing wind noise from outside the vehicle, noise from tires, and the like coming inside the vehicle interior have been proposed. For example, a vehicle package tray, which is disposed on a back side of a rear seat in a vehicle, has been known. The vehicle package tray is one of interior parts in a vehicle, serves as a design for improving an appearance of the vehicle interior, and also functions as a place where an object is placed, or where vehicle accessories such as a speaker and a stop lamp are embedded. Furthermore, the vehicle package tray is configured as a wall which sections a trunk space and a vehicle interior space and thereby prevents noise from the outside of the vehicle interior from entering from the trunk space to the vehicle interior space.

Here, the vehicle package tray is required to have predetermined rigidity since an object is placed thereon or vehicle accessories such as a speaker and a stop lamp are embedded therein. A vehicle package tray which is formed of an injection-molded article of thermoplastic synthetic resin in order to obtain such rigidity has been generally known. In addition, a vehicle package tray, as a fiber-reinforced plastic article formed into a predetermined shape by thermal fusion bonding and compression molding by heating and pressurizing a base layer in which a fiber-reinforced material and thermoplastic synthesis fiber are mixed, has been also generally known.

However, both the vehicle package trays as the injection-molded article and as a fiber-reinforced plastic article have a problem that the weights thereof are heavy despite having rigidity. In addition, these vehicle package trays have a sound blocking performance for blocking noise from the trunk and do not substantially have a sound absorbing performance. Therefore, a sound absorbing material is attached to the surface of the vehicle package tray on the side of the trunk in order to add the sound absorbing performance, which results in a further increase in the weight, and there is a concern that manufacturing cost increases. In addition, there is a problem that it is difficult to perform an operation for embedding the vehicle accessories such as the speaker and the stop lamp (JP-A-7-89395, for example).

Thus, a vehicle package tray in JP-A-2006-15857 has been known in view of the above problems. The vehicle package tray is a vehicle package tray with a configuration in which a front surface material is attached to a hard urethane foam layer. The vehicle package tray has enough rigidity for placing an object thereon or embedding vehicle accessories therein by forming the hard urethane foam layer to obtain a predetermined plate thickness, and the vehicle package has the sound absorbing property by the configuration of the urethane foam layer.

However, the above vehicle package tray in JP-A-2006-15857 is configured such that desired rigidity for the vehicle package tray is covered only by hardness of the hard urethane foam layer. Here, the plate thickness of the hard urethane foam layer is set to 25 mm in a configuration with an increased plate thickness in JP-A-2006-15857. Here, it is not preferable to increase the plate thickness in view of vehicle design since the vehicle package tray is disposed in a limited space on a back side of a rear seat. In addition, there is also a concern that the weight of the vehicle package tray with the increased plate thickness becomes heavy as a result. In addition, there is a concern that it becomes difficult to perform molding into a three-dimensional shape when molding in a state where the plate thickness of the hard urethane foam layer is increased. Moreover, there is a concern that so-called airflow contamination remarkably appears on the surface of the front surface material due to airflow between the trunk space and the vehicle interior space only by the configuration in which the front surface material is attached to the hard urethane foam layer.

Thus, there has been a need for an improved vehicle package tray which is light, has rigidity for mounting an object thereon and embedding vehicle accessories therein, and having also a sound absorbing performance.

SUMMARY

First, according to a first aspect of the present disclosure, the vehicle package tray is disposed in the back of a rear seat of a vehicle. In the vehicle package tray, sheet-shaped fiber-reinforced materials, in which thermal hardening resin is impregnated, are overlapped on both surfaces of a semi-hard urethane foam layer. A front surface material is overlapped on a surface of one fiber-reinforced material, in which the thermal hardening resin is impregnated, via a first adhesive film. A back material is overlapped on a surface of the other fiber-reinforced material, in which the thermal hardening fiber-reinforced resin is impregnated, via a second adhesive film. The laminated body obtains a sound absorbing performance by being formed into a three-dimensional shape by being pinched and fixed by a press die, heated, pressurized, and thereby fused.

With the above configuration, the vehicle package tray is configured to include the semi-hard urethane foam layer. Here, a configuration including the semi-hard urethane foam layer is employed in view of a problem that the strength lacks in the case of a configuration including a soft urethane foam layer and a hard urethane foam layer is not easily formed into a three-dimensional shape. Furthermore, the sheet-shaped fiber-reinforced materials, in which the thermal hardening resin is impregnated, are overlapped on both surfaces of the semi-hard urethane foam layer. Although this can be considered to be because the strength lacks in the configuration including only the semi-hard urethane foam layer, it is possible to achieve desired rigidity for the vehicle package tray by the laminated configuration of the fiber-reinforced materials which also provides rigidity in addition to the configuration of the semi-hard urethane foam layer. In addition, the laminated structure of the semi-hard urethane foam layer and the fiber-reinforced materials makes it possible to thin the plate thickness as compared with the configuration which includes only a hard urethane foam layer and to reduce weight. In addition, the configuration of the semi-hard urethane foam layer can provide a vehicle package tray with a sound absorbing performance. Moreover, the front surface material and the back material which are configured on the outer surfaces of the semi-hard urethane foam layer and the fiber-reinforced material are also overlapped, pinched and fixed by the press die, and heated and pressurized. Therefore, it is possible to obtain inexpensive vehicle package tray by a smaller number of processes. In addition, the semi-hard urethane foam layer makes it easier to form three-dimensional shape by press molding. As described above, it is possible to provide a vehicle package tray which has rigidity for allowing placement of an article thereon and assembly of vehicle accessories therein and further has a sound absorbing performance.

Next, according to a second aspect of the present disclosure, in the vehicle package tray according to the first aspect, an airflow blocking layer which blocks airflow is provided in any one of the first adhesive film and the second adhesive film.

With the above configuration, it is possible to block airflow between a trunk space and a vehicle interior space and suppress adhesion of so-called airflow contamination to the surface of the front surface material. In addition, the airflow blocking layer also provides a sound blocking performance. For example, when the airflow blocking layer is provided on the side of the first adhesive film on which the front surface material is overlapped, the sound blocking performance is exhibited between the front surface material and the fiber-reinforced material. Thus, since the semi-hard urethane foam layer is provided at a position closer to the side of the back material than the airflow blocking layer, the vehicle package tray which absorbs sound on the side of the trunk when mounted on the vehicle is obtained. On the other hand, when the airflow blocking layer is provided on the side of the second adhesive film on which the back material is overlapped, the sound blocking performance is exhibited between the back material and the fiber-reinforced material. Thus, since the semi-hard urethane foam layer is provided at a position closer to the front surface material than the airflow blocking layer, the vehicle package tray which absorbs sound on the side of the vehicle interior when mounted on the vehicle is obtained. That is, it is possible to select which one side out of the vehicle interior side or the trunk side the sound absorbing performance is to be provided depending on a laminated position of the airflow blocking layer.

Next, according to a third aspect of the present disclosure, in the vehicle package tray according to the second aspect, the airflow blocking layer which is provided in any one of the first adhesive film and the second adhesive film is configured by a film made of synthetic resin with a melting point with which the film is not melted when pinched and fixed by the press die and subjected to heating and pressurizing processes, adhesive layers configured by synthetic resin films with a melting point with which the synthetic resin film is melted when pinched and fixed by the press die and subjected to the heating and pressurizing processes are configured on both surfaces of the airflow blocking layer, and the airflow blocking layer is interposed between the adhesive layers to form a multi-layered film.

With the above configuration, it is possible to provide the sound blocking performance, and also facilitate adhesion of the front surface and the back material to the fiber-reinforced materials.

Next, according to a fourth aspect of the present disclosure, in the vehicle package tray according to any one of the first to third aspects, the semi-hard urethane foam layer has CS hardness from 30 to 55, density from 0.025 g/cm$^3$ to 0.035 g/cm$^3$, a cell diameter from 0.2 mm to 0.5 mm, and an open-cell rate of not less than 90% in the semi-hard urethane foam layer.

With the above configuration, the semi-hard urethane foam layer has the CS hardness from 30 to 55, the density from 0.025 g/cm$^3$ to 0.035 g/cm$^3$, the cell diameter from 0.2 mm to 0.5 mm, and the open-cell rate of not less than 90%. It is possible to preferably employ the semi-hard urethane foam layer with the above configuration from an aspect that the vehicle package tray has both the sound absorbing performance and the strength.

Next, according to a fifth aspect of the present disclosure, in the vehicle package tray according to the fourth aspect, the semi-hard urethane foam layer has a thickness from 2.0 mm to 10.0 mm before molding by heating and pressurizing.

With the above configuration, the thickness of the semi-hard urethane foam layer ranges from 2.0 mm to 10.0 mm before molding by heating and pressurizing. Thus, it is possible to preferably employ the thickness of the semi-hard urethane foam layer with the above configuration from aspects of the sound absorbing performance, the strength, and further the weight of the vehicle package tray.

Next, according to a sixth aspect of the present disclosure, in the vehicle package tray according to any one of the first to fifth aspects, the fiber-reinforced material has a unit weight from 100 g/m$^2$ to 250 g/m$^2$.

With the above configuration, the fiber-reinforced material has a unit weight from 100 g/m$^2$ to 250 g/m$^2$. Thus, it is possible to preferably employ the unit weight of the fiber-reinforced material with the above configuration from aspects of the strength and the weight of the vehicle package tray.

Next, according to a seventh aspect of the present disclosure, in the vehicle package tray according to any one of the first to sixth aspects, the airflow blocking layer is provided in the second adhesive film.

With respect to the above configuration, glass disposed in the back of the vehicle package tray is formed to be thin from a view point of light weight in some cases. Therefore, there is a concern that noise from the outside of the vehicle enters the vehicle interior through the glass. Here, in the above configuration, the airflow blocking layer is provided in the second adhesive film which is overlapped on the fiber-reinforced material and the back material. Thus, when the semi-hard urethane foam layer is provided at a position closer to the side of the front surface than the airflow blocking layer, a configuration in which noise on the side of the vehicle interior is absorbed when the vehicle package tray is mounted on the vehicle is obtained. Here, the vehicle package tray is disposed in the back of the rear seat of the vehicle. Therefore, the vehicle package tray can preferably absorb sound before the noise entering the vehicle interior through the glass reaches the rear seat.

DESCRIPTION OF EMBODIMENTS

Figure 1:
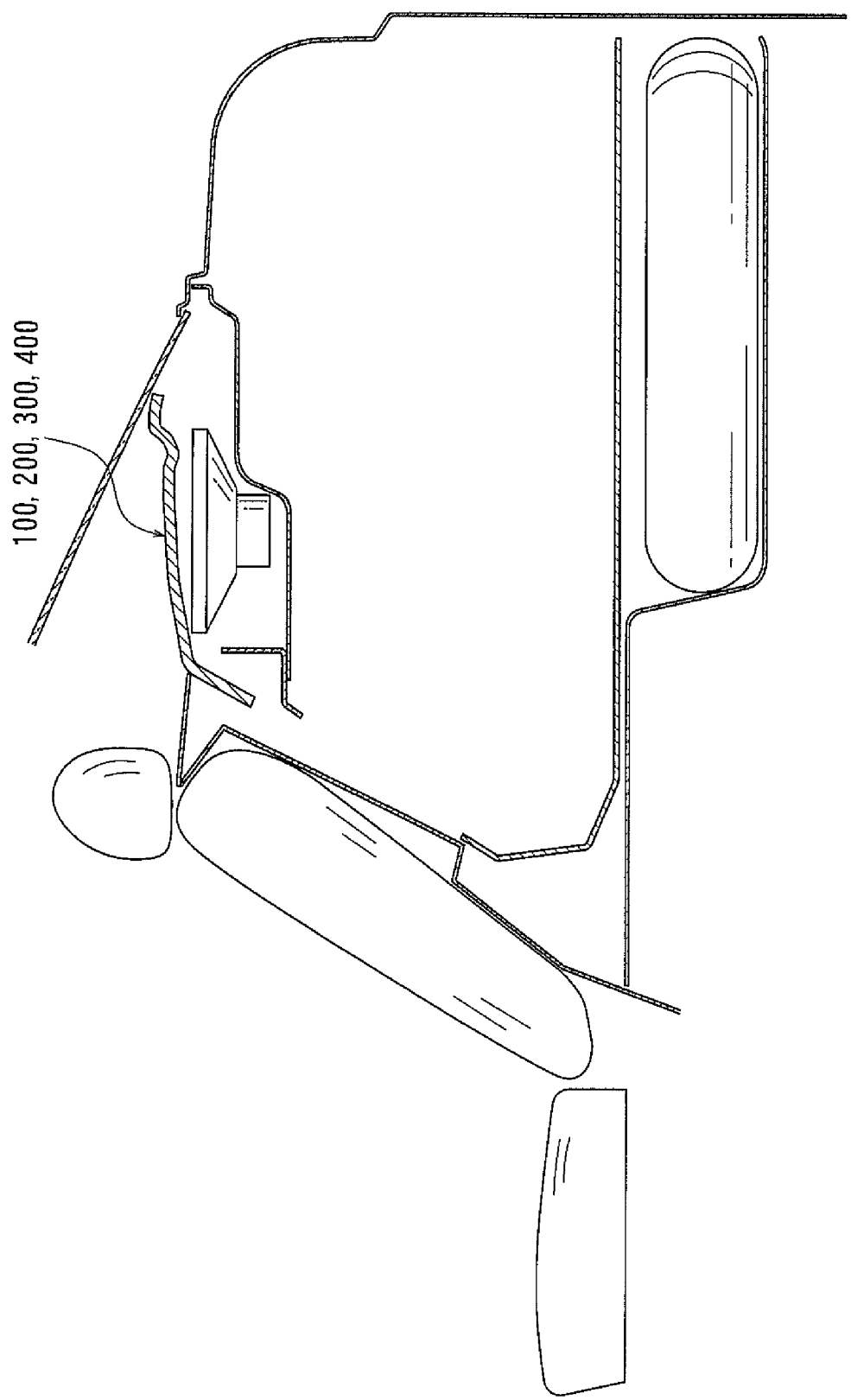
FIG. 1 is an overall perspective view of a vehicle to which a vehicle package tray according to an example of the present disclosure is applied.

Hereinafter, a description will be given of embodiments for implementing the present disclosure by using the drawings.

A vehicle package tray is employed as an interior part of a vehicle, and for example, a sheet-shaped member which is disposed on a back side of a rear seat of a vehicle to section a trunk space and a vehicle interior space of the vehicle. In the vehicle package tray, sheet-shaped fiber-reinforced materials with thermoplastic resin impregnated therein are superimposed on both surfaces of a semi-hard urethane foam layer. On a front surface of the fiber-reinforced material with the thermoplastic resin impregnated therein, a front surface material is superimposed via a first adhesive film. On the front surface of the other fiber-reinforced material with the thermoplastic resin impregnated therein, a back material is superimposed via a second adhesive film. The laminated body is pinched and fixed by a press die, fused by being heated and pressurized, and thereby formed into a three-dimensional shape. In addition, an airflow blocking layer for blocking airflow is provided in any one of the first adhesive film and the second adhesive film.

<Concerning Semi-Hard Urethane Foam Layer>

In the present disclosure, the semi-hard urethane foam layer with CS hardness from 30 to 55, density from 0.025 g/cm$^3$ to 0.035 g/cm$^3$, a cell diameter from 0.2 mm to 0.5 mm, and an open-cell rate of not less than 90% is used.

Here, the CS hardness ranges from 30 to 55. If the CS hardness is less than 30, there is a concern that the semi-hard urethane foam layer becomes soft and less strong for placing an object thereon. In addition, if the CS hardness exceeds 55, the semi-hard urethane foam layer becomes hard and becomes not suitable for being a three-dimensional shape. Here, the CS hardness preferably ranges from 35 to 45. In addition, the hardness is a numerical value measured by a CS hardness meter.

In addition, the density ranges from 0.025 g/cm$^3$ to 0.035 g/cm$^3$. If the density is less than 0.025 g/cm$^3$, it becomes difficult to set ranges of the CS hardness and the open-cell rate to the above ranges. Moreover, if the density exceeds 0.035 g/cm$^3$, the weight increases, which is not preferable.

The cell diameter ranges from 0.2 mm to 0.5 mm. The sound absorbing property is degraded if the cell diameter is less than 0.2 mm, and it is not preferable that the cell diameter exceed 0.5 mm in terms of securing the strength. Here, the cell diameter more preferably ranges from 0.22 mm to 0.45 mm in view of both the sound absorbing property and the strength.

In addition, although a higher open-cell rate is more preferable, one having an open-cell rate of not less than 90% is used in consideration of the sound absorbing performance.

In addition, the thickness of the semi-hard urethane layer preferably ranges from 2.0 mm to 10.0 mm. If the thickness is less than 2.0 mm, there is a concern that the strength lacks, and there is also a case where a desired sound absorbing property cannot be obtained. In addition, if the thickness exceeds 10.0 mm, the weight increases while the strength increases. In addition, such thickness is not appropriate for forming a three-dimensional shape. Moreover, since the vehicle package tray is disposed in a limited space on the back side of the rear seat, it is not preferable that the thickness further increases if desired rigidity and sound absorbing property can be obtained. In view of the above points, the thickness of the semi-hard urethane layer more preferably ranges from 4.0 mm to 8.0 mm. The semi-hard urethane foam layer is formed into a predetermined shape by cutting a preformed plate-shaped semi-hard urethane foam layer to have a thickness from 2.0 mm to 10.0 mm.

<Concerning Thermal Hardening Resin>

Various kinds of thermal hardening resin can be selected. Here, it is preferable to select urethane resin from a viewpoint that the urethane resin can easily fit with the semi-hard urethane foam layer. The urethane resin is provided on both surfaces of the semi-hard urethane foam layer. Here, the urethane resin may be any of urethane resin which is applied to both surfaces of the semi-hard urethane foam layer by a roll coater, spray, or the like and urethane resin which is attached to the semi-hard urethane foam layer in a state where the urethane resin is impregnated in a fiber-reinforced material which will be described later.

<Concerning Fiber-Reinforced Material>

The fiber-reinforced material is formed into a sheet shape or a mat shape by appropriately selecting inorganic fiber such as chopped strand, natural fiber such as jute (*corchorus capsularis*), kenaf (*hibiscus cannabinus*), ramie, hemp (marijuana), sisal hemp, or bamboo, which is organic fiber, or the like and bindering the selected fiber. In addition, the fiber-reinforced material may be formed into a sheet shape or a mat shape by needle process instead of bindering. Here, a glass fiber mat is selected as the fiber-reinforced material. As the glass fiber mat, a glass fiber mat formed into a sheet shape by appropriately fixing chopped strand, which has been obtained by cutting glass fiber as inorganic fiber to a length from 50 mm to 100 mm, by binder is selected. In addition, the glass fiber used herein may be glass fiber (continuous mat) which is fixed by the binder without being cut, glass fiber nonwoven cloth, glass fiber paper, or glass fiber cloth as well as the glass fiber obtained by consolidating chopped strand as described above. Moreover, the unit weight of the fiber-reinforced material ranges from 100 g/m$^2$ to 250 g/m$^2$. In relation to the unit weight herein, although a unit weight can be selected and used so as to adapt required strength and other various conditions, strength lacks if the unit weight is less than 100 g/m$^2$, and the weight increases while the strength is sufficiently secured if the unit weight exceeds 250 g/m$^2$, which are not preferable. In view of such strength and weight, the unit weight preferably ranges from 135 g/m$^2$ to 200 g/m$^2$.

<Concerning Configuration (Multi-Layered Film) Including First Adhesive Film, Second Adhesive Film, and Air Blocking Layer>

Here, the first adhesive film and the second adhesive film are configured so as to thermally fuse the front material or the back material to the fiber-reinforced material. Here, it is the first adhesive film that is stacked between the front material and the fiber-reinforced material, and it is the second adhesive film that is stacked between the back material and the fiber-reinforced material. The first adhesive film and the second adhesive film are made of synthetic resin films with a melting point with which the synthetic resin films are melted when pinched and fixed by a press die and subjected to heating and pressurizing processes. The synthetic resin films of the adhesive layers are made from olefin resin. For the first adhesive film and the second adhesive film configured as the adhesive layers, a thickness from 10 μm to 100 μm and a unit weight from 10 g/m$^2$ to 100 g/m$^2$ are selected. In addition, any one of the first adhesive film and the second adhesive film may be provided with an airflow blocking layer. This means that any one of the first adhesive film and the second adhesive film is configured as a multi-layered film in which two adhesive layers are provided and an airflow blocking layer is interposed between the adhesive layers. The airflow blocking layer is configured by a film made of synthetic resin with a melting point with which the airflow blocking layer is not melted when pinched and fixed by a press die and subjected to heating and pressurizing processes. For example, the synthetic resin film of the airflow blocking layer may be a layer which is made of polyamide synthetic resin, polyester resin, or the like and blocks airflow, and may configure a multi-layered film by overlapping the adhesive layers on both surfaces of the airflow blocking layer so as to have a thickness from 10 μm to 100 μm and a unit weight from 10 g/m² to 100 g/m².

<Front Surface Material and Back Material>

A front surface material and a back material with known configurations can be appropriately selected. The front surface material configures a design surface of the vehicle package tray. The front surface material may be configured only by non-woven cloth made of synthetic resin, or may have three-layer configuration of knit, urethane and non-woven cloth. The unit weight of the front surface material preferably ranges from 80 g/m² to 250 g/m². The back material is made of non-woven cloth made of synthetic resin, paper, or the like. In addition, the back material is configured such that the second adhesive film is overlapped thereon. The back material is preferably configured to have a total thickness from 0.5 mm to 1.5 mm and a total unit weight from 110 g/m² to 190 g/m².

<Concerning Unit Weight>

The unit weight of the vehicle package tray according to the present disclosure preferably ranges from 400 g/m² to 1000 g/m² based on the above configuration. If the unit weight is less than 400 g/m², it is difficult to achieve desired maximum bending load and bending elastic gradient for the vehicle package tray, which will be described later. In addition, the unit weight exceeding 1000 g/m² is not preferable since the weight becomes heavy despite that the maximum bending load and the bending elastic gradient can be achieved. Here, the weight unit more preferably ranges from 500 g/m² to 900 g/m² in view of the maximum bending load, the bending elastic gradient, and the weight.

<Concerning Maximum Bending Load>

The vehicle package tray according to the present disclosure has the above configuration and thereby has maximum bending load from 20 N to 200 N. If the maximum bending load is less than 20 N, rigidity for placing an article thereon or embedding vehicle accessories such as a speaker and a stop lamp therein is not obtained. In addition, if the maximum bending load exceeds 200 N, the weight of each component increases while the strength is sufficiently secured, which is not preferable. The maximum load is a numerical value measured based on a standard of JIS K 6911.

<Concerning Bending Elastic Gradient>

In addition, the vehicle package tray according to the present disclosure has the above configuration and thereby has bending elastic gradient from 25 N/cm to 100 N/cm. If the bending elastic gradient is less than 25 N/cm, rigidity for placing an article thereon or embedding vehicle accessories such as a speaker and a stop lamp therein is not obtained. In addition, if the bending elastic gradient exceeds 100 N/cm, the weight of each component increases while the strength is sufficiently secured, which is not preferable. The maximum load is a numerical value measured based on a standard of JIS K 6911. As for the bending elastic gradient, load is added from the upper side of a test piece of 50 mm×150 mm at a speed of 50 mm/min with a distance between supporting points of 100 mm. The bending elastic gradient is elastic gradient, which is obtained from the load obtained at that time and initial inclination of load-displacement curve, in units of "N/cm" (bending elastic gradient when a width of a test sample is 50 mm).

<Concerning Sound Absorption Coefficient>

The vehicle package tray according to the present disclosure has the above configuration and thereby has a sound absorption coefficient of at least 20% at a frequency band from 1600 Hz to 6300 Hz as a whole. In addition, the sound absorption coefficient is a numerical value measured by a reverberant sound absorption coefficient based on a standard of JIS A 1409.

Such a vehicle package tray according to the present disclosure is configured as a vehicle package tray having the semi-hard urethane foam layer. Here, the semi-hard urethane foam layer is used in view of problems that a configuration of a soft urethane foam layer causes lack of strength and that a configuration of a hard urethane foam layer causes difficulty in forming in a three-dimensional shape. Furthermore, the sheet-shaped fiber-reinforced materials in which thermal hardening resin has been impregnated are overlapped on both surfaces of the semi-hard urethane foam layer. Although this can be considered to be because the strength lacks in the configuration including only the semi-hard urethane foam layer, it is possible to achieve desired rigidity for the vehicle package tray by the laminated configuration of the fiber-reinforced materials which also provides rigidity in addition to the configuration of the semi-hard urethane foam layer. In addition, the laminated structure of the semi-hard urethane foam layer and the fiber-reinforced materials makes it possible to thin the plate thickness as compared with the configuration which includes only a hard urethane foam layer and to reduce weight. In addition, the configuration of the semi-hard urethane foam layer can provide a vehicle package tray with a sound absorbing performance. Moreover, it is possible to obtain inexpensive vehicle package tray by a smaller number of processes since the front surface material and the back material which are provided on the outer surfaces of the semi-hard urethane foam layer and the fiber-reinforced material are also stacked, pinched and fixed by a press die, and subjected to heating and pressurization. In addition, the semi-hard urethane foam layer makes it easier to form three-dimensional shape by press molding. As described above, it is possible to provide a vehicle package tray which has rigidity for allowing placement of an article thereon and embedment of vehicle accessories therein and further has a sound absorbing performance.

In addition, any one of the first adhesive film and the second adhesive film is provided with an airflow blocking layer for blocking airflow. Thus, it is possible to block airflow between the trunk space and the vehicle interior space and suppress adhesion of so-called airflow contamination onto the surface of the front surface material. In addition, it is also possible to provide a sound blocking performance by the airflow blocking layer. For example, when the airflow blocking layer is provided on the side of the first adhesive film on which the front surface material is overlapped, the sound blocking performance is exhibited between the front surface material and the fiber-reinforced material. So, since the semi-hard urethane foam layer is provided at a position closer to the side of the back material than the airflow blocking layer, a vehicle package tray which absorbs sounds on the side of the trunk when mounted on a vehicle is provided. On the other hand, when the airflow blocking layer is provided on the side of the second adhesive film on which the back material is overlapped, the sound blocking performance is exhibited between the back material and the fiber-reinforced material. So, since the semi-hard urethane foam layer is provided at a position closer to the side of the front surface material than the airflow blocking layer, a vehicle package tray which absorbs sound on the side of the vehicle interior when mounted on a vehicle is provided. That is, it is able to determine which one of the vehicle interior side and the trunk side the sound absorbing performance is to be provided depending on a laminated position of the airflow blocking layer.

In addition, it is possible to easily adhere the front surface and the back material to the fiber-reinforced materials while providing the sound blocking performance.

In addition, the semi-hard urethane foam layer has CS hardness from 30 to 55, density from 0.025 g/cm$^3$ to 0.035 g/cm$^3$, a cell diameter from 0.2 mm to 0.5 mm, and an open-cell rate of not less than 90%. It is possible to preferably employ the semi-hard urethane foam layer with the above configuration from an aspect of providing both the sound absorbing performance and the strength to the vehicle package tray.

In addition, the thickness of the semi-hard urethane foam layer before molding by heating and pressurizing is a thickness from 2.0 mm to 10.0 mm. Thus, it is possible to preferably employ the thickness of the semi-hard urethane foam layer from an aspect of the sound absorbing performance, strength, and further a weight of the vehicle package tray.

In addition, the unit weight of the rein-forced material ranges from 100 g/m$^2$ to 250 g/m$^2$. Thus, it is possible to preferably employ the unit weight of the fiber-reinforced material with the above configuration from an aspect of the strength and the weight of the vehicle package tray.

In addition, there is also a mode in which the airflow blocking layer is provided on the second adhesive film. The glass disposed in the back of the vehicle package tray is formed to be thin from the viewpoint of a light weight in some cases. For this reason, there is a concern that noise from the outside of the vehicle enters the vehicle interior through the glass. Here, according to the above configuration, the airflow blocking layer is provided on the second adhesive film which is overlapped on the fiber-reinforced material and the back material. Thus, since the semi-hard urethane foam layer is formed at a position closer to the side of the front surface material than the airflow blocking layer, a configuration for absorbing sound on the side of the vehicle interior is obtained when the vehicle tray package is mounted on the vehicle. Here, the vehicle package tray is disposed in the back of the rear seat. Therefore, the vehicle package tray can preferably absorb sound before the noise coining inside the vehicle interior through the glass reaches the rear seat.

Hereinafter, a specific description will be given of the present disclosure based on Examples and Comparative Examples.

Example 1

Figure 2:
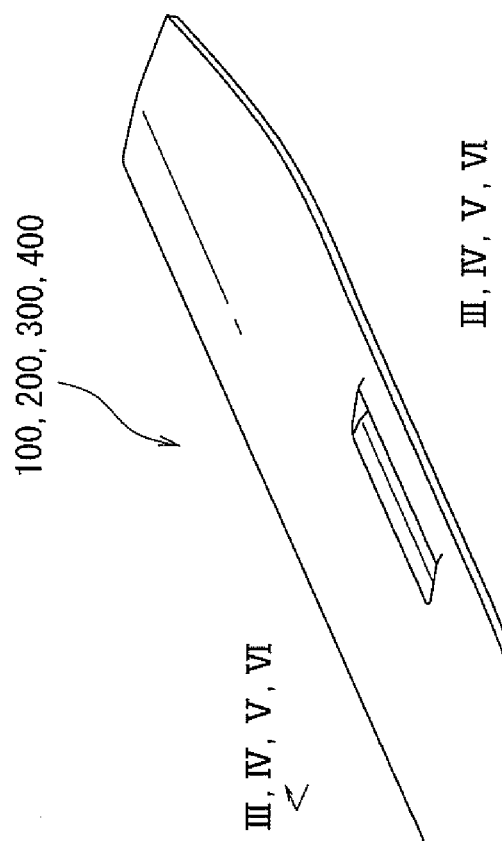
FIG. 2 is an overall perspective view showing a vehicle package tray according to an example of the present disclosure.

FIG. 1 shows a vehicle to which a vehicle package tray 100 according to this example is applied. FIG. 2 is an entire perspective view showing the vehicle package tray 100 according to the example of the present disclosure, and FIG. 3 is a partially enlarged cross-sectional view of the vehicle package tray 100 according to the example of the present disclosure.

Figure 3:
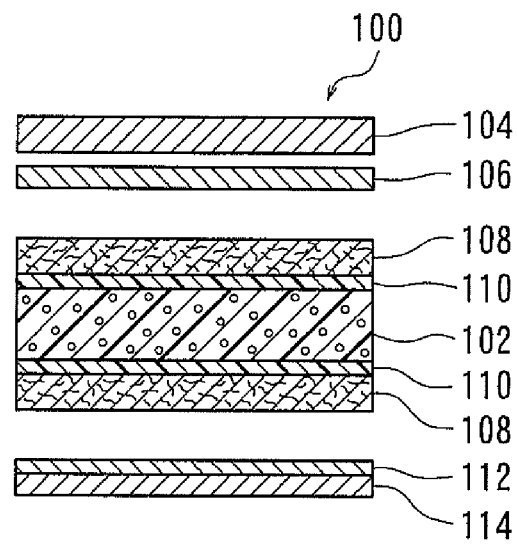
FIG. 3 is a partially enlarged cross-sectional view of a vehicle package tray according to Example 1 of the present disclosure.

As shown in FIG. 3, a configuration of a vehicle package tray 100 according to Example 1 is formed into a three-dimensional shape by pinching and fixing by a press die a laminated body including a front surface material 104, a first adhesive film 106, a glass fiber mat 108, urethane resin 110, a semi-hard urethane foam layer 102, urethane resin 110, a glass fiber mat 108, a second adhesive film 112, and a back material 114, heating and pressurizing the laminated body, and thereby fusing the laminated body. Here, the semi-hard urethane foam layer 102 of the vehicle package tray 100 in Example 1 has respective properties including CS hardness of 40, density of 0.032 g/cm$^3$, a cell diameter of 0.4 mm, and an open-cell rate of 90%. In addition, the semi-hard urethane foam layer 102 with a thickness of 7.5 mm is selected.

The front surface material 104 has a three-layer configuration of knit, urethane, and non-woven cloth, and a unit weight of the front surface material 104 is 100 g/m$^2$. The first adhesive film 106 is configured by a multi-layered film in which adhesive layers are configured by two synthetic resin films made of polyethylene as olefin resin and a polyamide synthetic resin film as a synthetic resin film for the airflow blocking layer is interposed between the adhesive layers. The multi-layered film is configured to have a thickness of 50 μm and a unit weight of 45 g/m$^2$. In addition, a sheet-shaped glass fiber mat 108 with a unit weight of 200 g/m$^2$, in which the appropriate urethane resin 110 is impregnated, is arranged. Then, the sheet-shaped glass fiber mat 108, in which the urethane resin 110 is impregnated, is overlapped on the upper side of the semi-hard urethane foam layer 102. In addition, the upper side of the semi-hard urethane foam layer 102 in FIG. 3 corresponds to "one side" in the present disclosure, and this surface is on the side of the vehicle interior.

The sheet-shaped glass fiber mat 108 with a unit weight of 200 g/m$^2$, in which the appropriate urethane resin 110 is impregnated, is overlapped on the lower side of the semi-hard urethane foam layer 102. The back material 114 is overlapped on the surface (lower side) of the glass fiber mat 108, in which the urethane resin 110 is impregnated, via the second adhesive film 112. For the second adhesive film 112 as the adhesive layer, a synthetic resin film made of polyethylene as olefin resin is selected. The second adhesive film 112 and the back material 114 made of synthetic fiber non-woven cloth are overlapped so as to be configured to have a total thickness of 1.0 mm and a total unit weight of 110 g/m$^2$. In addition, the lower side of the semi-hard urethane foam layer 102 in FIG. 3 corresponds to "the other side" in the present disclosure, and this surface is on the side of the trunk space.

The laminated body is pinched and fixed by a press die and heated and pressurized. By the heating process, the glass fiber mat 108, the front surface material 104, and the back material 114 are hardened and fused to the semi-hard urethane foam layer 102 in a state where the glass fiber mat 108, the front surface material 104, and the back material 114 are laminated on the semi-hard urethane foam layer 102. In addition, the vehicle package tray 100 is formed into a desired three-dimensional shape by pressurization molding.

Figure 7:
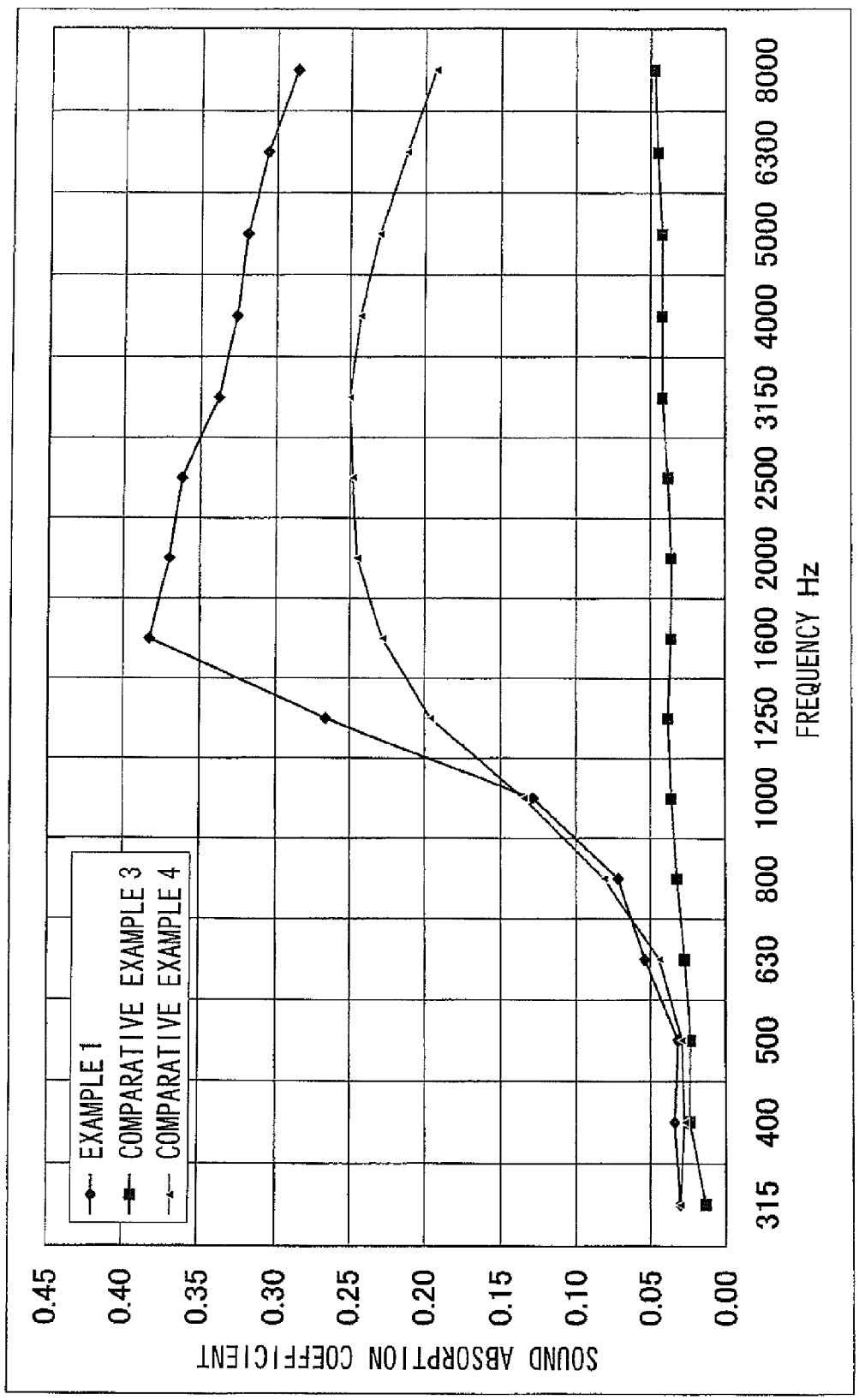
FIG. 7 is a graph showing a relationship between a frequency and a sound absorption coefficient.

With the above configuration, a vehicle package tray 100 with a plate thickness of 7.0 mm and a unit weight of 910 g/m$^2$ was obtained in Example 1. Maximum bending load of the vehicle package tray 100 was 91 N in the front-back direction of the vehicle, namely the longitudinal direction. In addition, bending elastic gradient of the vehicle package tray 100 was 170 N/cm in the front-back direction of the vehicle, namely the longitudinal direction. Moreover, a sound absorption coefficient of at least 25% was obtained in a frequency band from 1250 Hz to 8000 Hz as shown in FIG. 7. In addition, a sound absorption coefficient of at least 30% was obtained in a frequency band from 1600 Hz to 6300 Hz. In addition, a sound absorption coefficient of at least 35% was obtained in a frequency band from 1600 to 2500 Hz.

Example 2

Figure 4:
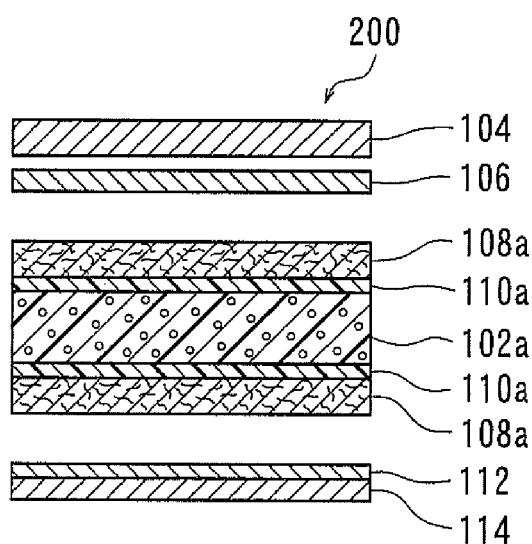
FIG. 4 is a partially enlarged cross-sectional view of a vehicle package tray according to Example 2 of the present disclosure.

Next, a description will be given of Example 2. As shown in FIG. 4, a configuration of a vehicle package tray 200 according to Example 2 is formed into a three-dimensional shape by pinching and fixing by a press die a laminated body including the front surface material 104, the first adhesive film 106, a glass fiber mat 108a, urethane resin 110a, a semi-hard urethane foam layer 102a, urethane resin 110a, a glass fiber mat 108a, the second adhesive film 112, and the back material 114, heating and pressurizing the laminated body to fuse the laminated body.

Although the semi-hard urethane foam layer 102a of the vehicle package tray 200 in Example 2 is configured by the same material as that in Example 1, the thickness of 5.5 mm is selected. The front surface material 104 has the same configuration as that in Example 1. The first adhesive film 106 has the same configuration as that in Example 1. In addition, the sheet-shaped glass fiber mat 108a with a unit weight of 200 g/m$^2$, in which the appropriate urethane resin 110a is impregnated, is arranged. Then, the sheet-shaped glass fiber mat 108a, in which the urethane resin 110a is impregnated, is overlapped on the upper side of the aforementioned semi-hard urethane foam layer 102a. In addition, the upper side of the semi-hard urethane foam layer 102a in FIG. 4 corresponds to "one side" in the present disclosure, and the surface is on the side of the vehicle interior.

The sheet-shaped glass fiber mat 108a with a unit weight of 200 g/m$^2$, in which the appropriate urethane resin 110a is impregnated, is overlapped on the lower side of the semi-hard urethane foam layer 102a. The back material 114 is overlapped on the surface (lower side) of the glass fiber mat 108a, in which the urethane resin 110a is impregnated, via the second adhesive film 112. The second adhesive film 112 and the back material 114 have the same configurations as those in Example 1. In addition, the lower side of the semi-hard urethane foam layer 102a in FIG. 4 corresponds to "the other side" in the present disclosure, and the surface is on the side of the trunk space.

The laminated body is pinched and fixed by a press die and heated and pressurized. By the heating process, the glass fiber mat 108a, the front surface material 104, and the back material 114 are hardened and fused to the semi-hard urethane foam layer 102a in a state where the glass fiber mat 108a, the front surface material 104, and the back material 114 are laminated on the semi-hard urethane foam layer 102a. In addition, the vehicle package tray 200 is formed into a desired three-dimensional shape by pressurization molding.

With the above configuration, a vehicle package tray 200 with a plate thickness of 5.0 mm and a unit weight of 846 g/m$^2$ was obtained in Example 2. Maximum bending load of the vehicle package tray 200 was 75 N in the front-back direction of the vehicle, namely the longitudinal direction. In addition, bending elastic gradient of the vehicle package tray 200 was 120 N/cm in the front-back direction of the vehicle, namely the longitudinal direction.

Example 3

Figure 5:
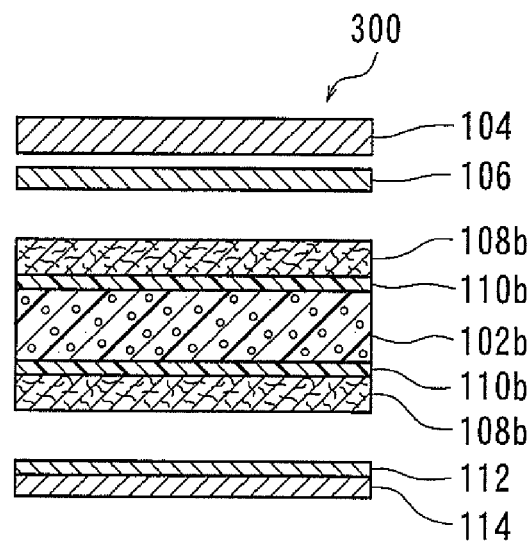
FIG. 5 is a partially enlarged cross-sectional view of a vehicle package tray according to Example 3 of the present disclosure.

Next, a description will be given of Example 3. As shown in FIG. 5, a configuration of a vehicle package tray 300 according to Example 3 is formed into a three-dimensional shape by pinching and fixing by a press die, a laminated body including the front surface material 104, the first adhesive film 106, a glass fiber mat 108b, urethane resin 110b, a semi-hard urethane foam layer 102b, urethane resin 110b, a glass fiber mat 108b, the second adhesive film 112, and the back material 114, and heating and pressurizing the laminated body to fuse the laminated body.

Although the semi-hard urethane foam layer 102b of the vehicle package tray 300 in Example 3 is configured by the same material as that in Example 1, the thickness of 4.0 mm is selected. The front surface material 104 has the same configuration as that in Example 1. The first adhesive film 106 has the same configuration as that in Example 1. In addition, the sheet-shaped glass fiber mat 108b with a unit weight of 135 g/m$^2$, in which the appropriate urethane resin 110b is impregnated, is arranged. Then, the sheet-shaped glass fiber mat 108b, in which the urethane resin 110b is impregnated, is overlapped on the upper side of the aforementioned semi-hard urethane foam layer 102b. In addition, the upper side of the semi-hard urethane foam layer 102b in FIG. 5 corresponds to "one side" in the present disclosure, and the surface is on the side of the vehicle interior.

The sheet-shaped glass fiber mat 108b with a unit weight of 135 g/m$^2$, in which the appropriate urethane resin 110b is impregnated, is overlapped on the lower side of the semi-hard urethane foam layer 102b. The back material 114 is overlapped on the surface (lower side) of the glass fiber mat 108b, in which the urethane resin 110b is impregnated, via the second adhesive film 112. The second adhesive film 112 and the back material 114 have the same configurations as those in Example 1. In addition, the lower side of the semi-hard urethane foam layer 102b in FIG. 5 corresponds to "the other side" in the present disclosure, and the surface is on the side of the trunk space.

The laminated body is pinched and fixed by a press die and heated and pressurized. By the heating process, the glass fiber mat 108b, the front surface material 104, and the back material are hardened and fused to the semi-hard urethane foam layer 102b in a state where the glass fiber mat 108b, the front surface material 104, and the back material are laminated on the semi-hard urethane foam layer 102b. In addition, the vehicle package tray 300 is formed into a desired three-dimensional shape by pressurization molding.

With the above configuration, the vehicle package tray 300 with a plate thickness of 3.5 mm and a unit weight of 668 g/m$^2$ was obtained in Example 3. Maximum bending load of the vehicle package tray 300 was 37 N in the front-back direction of the vehicle, namely the longitudinal direction. In addition, bending elastic gradient of the vehicle package tray 300 was 45 N/cm in the front-back direction of the vehicle, namely the longitudinal direction.

Example 4

Figure 6:
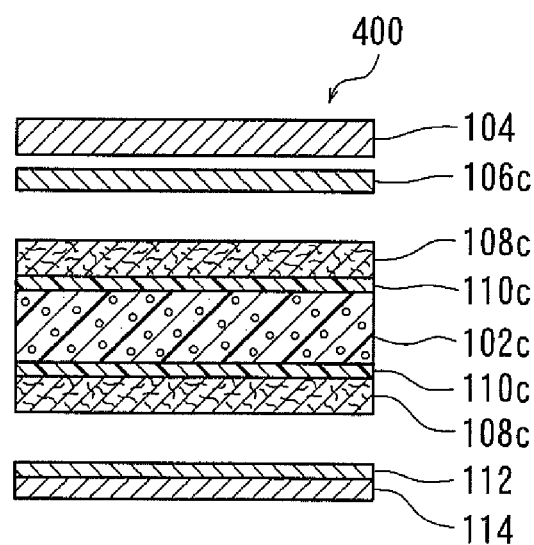
FIG. 6 is a partially enlarged cross-sectional view of a vehicle package tray according to Example 4 of the present disclosure.

Next, a description will be given of Example 4. As shown in FIG. 6, a configuration of a vehicle package tray 400 according to Example 4 is formed into a three-dimensional shape by pinching and fixing by a press die a laminated body including the front surface material 104, a first adhesive film 106c, a glass fiber mat 108c, urethane resin 110c, a semi-hard urethane foam layer 102c, urethane resin 110c, a glass fiber mat 108c, the second adhesive film 112, and the back material 114, heating and pressurizing the laminated body to fuse the laminated body.

Although the semi-hard urethane foam layer 102c of the vehicle package tray 400 in Example 4 is configured by the same material as that in Example 1, the thickness of 5.5 mm is selected. The front surface material 104 has the same configuration as that in Example 1. The first adhesive film 106c is different from the multi-layered film in Example 1 in that the first adhesive film 106c includes an adhesive layer configured only by a synthetic resin film made of polyethylene as olefin resin so as to have a thickness of 50 μm and a unit weight of 45 g/m$^2$. In addition, the sheet-shaped glass fiber mat 108c with a unit weight of 100 g/m$^2$, in which the appropriate urethane resin 110c is impregnated, is arranged. Then, the sheet-shaped glass fiber mat 108c, in which the urethane resin 110c is impregnated, is overlapped on the upper side of the aforementioned semi-hard urethane foam layer 102c. In addition, the upper side of the semi-hard urethane foam layer 102c in FIG. 6 corresponds to "one side" in the present disclosure, and the surface is on the side of the vehicle interior.

The sheet-shaped glass fiber mat 108c with a unit weight of 100 g/m², in which the appropriate urethane resin 110c is impregnated, is overlapped on the lower side of the semi-hard urethane foam layer 102c. The back material 114 is overlapped on the surface (lower side) of the glass fiber mat 108c, in which the urethane resin 110c is impregnated, via the second adhesive film 112. The second adhesive film 112 and the back material 114 have the same configurations as those in Example 1. In addition, the lower side of the semi-hard urethane foam layer 102c in FIG. 6 corresponds to "the other side" in the present disclosure, and the surface is on the side of the trunk space.

The laminated body is pinched and fixed by a press die and heated and pressurized. By the heating process, the glass fiber mat 108c, the front surface material 104, and the back material are hardened and fused to the semi-hard urethane foam layer 102c in a state where the glass fiber mat 108c, the front surface material 104, and the back material are laminated on the semi-hard urethane foam layer 102c. In addition, the vehicle package tray 400 is formed into a desired three-dimensional shape by pressurization molding.

With the above configuration, a vehicle package tray 400 with a plate thickness of 5.0 mm and a unit weight of 520 g/m² was obtained in Example 4. Maximum bending load of the vehicle package tray 300 was 24 N in the front-back direction of the vehicle, namely the longitudinal direction. In addition, bending elastic gradient of the vehicle package tray 400 was 28 N/cm in the front-back direction of the vehicle, namely the longitudinal direction.

<Comparison of Maximum Bending Load and Bending Elastic Gradient>

Next, comparison of the maximum bending load and the bending elastic gradient were compared using Comparative Examples 1 and 2 in which the properties of the semi-hard urethane foam layers used in the vehicle package trays 100, 200, 300, and 400 obtained in Examples 1 to 3 in Examples 1 and 4 were not changed and other configurations and unit weights were changed.

Comparative Example 1

Next, a description will be given of Comparative Example 1. The materials of the respective configurations used in Comparative Example 1 are substantially the same as those in Example 1. Here, although the semi-hard urethane foam layer in Comparative Example 1 is configured by the same material as that in Example 1, the thickness of 4.0 mm is selected.

The front surface material has the same configuration as that in Example 1. The first adhesive film is different from the multi-layered film in Example 1 in that the first adhesive film includes an adhesive layer configured only by a synthetic resin film made of polyethylene as olefin resin so as to be configured to have a thickness of 50 μm and a unit weight of 45 g/m². In addition, a sheet-shaped glass fiber mat with a unit weight of 90 g/m², in which appropriate urethane resin is impregnated, is arranged. Then, the sheet-shaped glass fiber mat, in which the urethane resin is impregnated, is overlapped on the upper side of the semi-hard urethane foam layer.

A sheet-shaped glass fiber mat with a unit weight of 90 g/m² is overlapped on the lower side of the semi-hard urethane foam layer. The back material is overlapped on the surface (lower side) of the glass fiber mat, in which the urethane resin is impregnated, via the second adhesive film. The second adhesive film includes an adhesive layer which is a synthetic resin film made of polyethylene as olefin resin. The second adhesive film and the back material made of synthetic resin non-woven fiber are overlapped so as to be configured to have a total thickness of 1.0 mm and a total unit weight of 50 g/m².

The laminated body is pinched and fixed by a press die and heated and pressurized. By the heating process, the glass fiber mat, the front surface material, and the back material are hardened and fused to the semi-hard urethane foam layer in a state where the glass fiber mat, the front surface material, and the back material are laminated on the semi-hard urethane foam layer. In addition, the vehicle package tray is formed into a desired three-dimensional shape by pressurization molding.

With the above configuration, a vehicle package tray in Comparative Example 1 with a plate thickness of 4.0 mm and a unit weight of 384 g/m² was obtained. Maximum bending load in Comparative Example 1 was 18 N in the front-back direction of the vehicle, namely the longitudinal direction. In addition, bending elastic gradient in Comparative Example 1 was 23 N/cm in the front-back direction of the vehicle, namely the longitudinal direction. As described above, the vehicle tray package with a lighter weight as those in Examples 1 to 4 is formed in terms of the unit weight. However, in view of a condition that the vehicle package tray preferably has maximum bending load from 20 N to 200 N and bending elastic gradient from 25 N/cm to 100 N/cm, the vehicle package tray in Comparative Example 1 which does not satisfy these values is not preferable as compared with the vehicle package trays in Examples 1 to 4.

Comparative Example 2

Next, a description will be given of Comparative Example 2. The materials of the respective configurations used in Comparative Example 2 are substantially the same as those in Example 1. Here, although the semi-hard urethane foam layer in Comparative Example 2 is configured by the same material as that in Example 1, the thickness of 6.5 mm is selected.

Here, the front surface material is configured only by non-woven cloth, and the unit weigh of the front surface material is set to 170 g/m² in Comparative Example 2. The first adhesive film has the same configuration as that in Example 1. A sheet-shaped glass fiber mat with a unit weight of 380 g/m², in which appropriate urethane resin is impregnated, is arranged. Then, the sheet-shaped glass fiber mat, in which the urethane resin is impregnated, is overlapped on the upper side of the semi-hard urethane foam layer.

A sheet-shaped glass fiber mat with a unit weight of 380 g/m², in which appropriate urethane resin is impregnated, is overlapped on the lower side of the semi-hard urethane foam layer. The back material is overlapped on the surface (lower side) of the glass fiber mat, in which the urethane resin is impregnated, via the second adhesive film. The second adhesive film includes an adhesive layer configured by a synthetic resin film made of polyethylene as olefin resin. The second adhesive film and the back material made of synthetic fiber non-woven cloth are overlapped so as to be configured to have a total thickness of 1.0 mm and a total unit weight of 190 g/m².

The laminated body is pinched and fixed by a press die and heated and pressurized. By the heating process, the glass fiber mat, the front surface material, and the back material are hardened and fused to the semi-hard urethane foam layer in a state where the glass fiber mat, the front surface material, and the back material are laminated on the semi-hard urethane foam layer. In addition, the vehicle package tray is formed into a desired three-dimensional shape by pressurization molding.

With the above configuration, a vehicle package tray in Comparative Example 2 with a plate thickness of 6.0 mm and a unit weight of 1318 g/m² was obtained. Maximum bending load in Comparative Example 2 was 118 N in the front-back direction of the vehicle, namely the longitudinal direction. In addition, bending elastic gradient in Comparative Example 2 was 228 N/cm in the front-back direction of the vehicle, namely the longitudinal direction. As described above, it can be considered that Comparative Example 2 satisfies the condition of the vehicle package tray from an aspect of rigidity since the maximum bending road is within the range from 20 N to 200 N and the bending elastic gradient is within the range from 25 N/cm to 100 N/cm. However, the unit weight is 1318 g/m², the vehicle package tray with a heavier weight as those in Examples 1 to 4 is formed. The vehicle package tray in Comparative Example 2 which increases in weight is not preferable as compared with the vehicle package trays in Examples 1 to 4 in view of the condition that the unit weigh preferably ranges from 400 g/m² to 1000 g/m².

Comparison of unit weights, plate thicknesses, maximum bending load, and bending elastic gradient of the vehicle package trays 100, 200, 300, and 400 in Examples 1 to 4 and the vehicle package trays in Comparative Examples 1 and 2 will be shown in Table 1. In addition, Table 1 also shows unit weights, plate thicknesses, maximum bending load, and bending elastic gradient in Comparative Example 3 of an injection-molded article in the related art and in Comparative Example 4 of fiber-reinforced plastic.

even at each frequency band from 315 Hz to 8000 Hz, and it is understood that the vehicle package tray is not excellent in the sound absorption coefficient.

Comparative Example 4

The vehicle package tray in Comparative Example 4 is a fiber-reinforced plastic article which is formed into a predetermined shape by heating and pressurizing a base material layer in which a fiber-reinforced material and thermoplastic synthetic resin are mixed, thereby causing thermal fusion bonding thereof, and performing pressurization molding thereon. As the fiber-reinforced material, kenaf at an amount of 40 wt % is selected. In addition, as the thermoplastic synthetic resin, polypropylene at an amount of 60 wt % is selected. A sheet-shaped article formed by mixing both the fiber is subjected to heating and pressurizing processed by a press machine. With the above configuration, the vehicle package tray in Comparative Example 4 formed to have a plate thickness of 3.5 mm and a unit weight of 1400 g/m² was obtained. Here, although it was possible to obtain a similar sound absorption coefficient to that in Example 1 at a frequency band from 315 Hz to 1000 Hz, only a sound absorption coefficient of 25% at a maximum was obtained in a frequency band which exceeds 1000, at 3150 Hz, as shown in FIG. 7.

It can be understood from the above that the sound absorption coefficients were lower in Comparative Examples 3 and

TABLE 1

| Specification | Unit Weight g/m² | Plate Thickness mm | Maximum Load N | | Elastic Gradient N/cm | | |
|---|---|---|---|---|---|---|---|
| | | | longitudinal | traverse | longitudinal | traverse | |
| Example 1 | 910 | 7.0 | 91 | 83 | 170 | 155 | |
| Example 2 | 846 | 5.0 | 75 | 50 | 120 | 95 | |
| Example 3 | 668 | 3.5 | 37 | 34 | 45 | 41 | |
| Example 4 | 520 | 5.0 | 24 | 23 | 28 | 26 | |
| Comparative Example 1 | 384 | 4.0 | 18 | 17 | 23 | 22 | |
| Comparative Example 2 | 1318 | 6.0 | 118 | 114 | 228 | 225 | |
| Comparative Example 3 | 1400 | 2.5 | 39 | 60 | 23 | 29 | Injection-molded Article |
| Comparative Example 4 | 1400 | 3.5 | 80 | — | 100 | — | Fiber-reinforced Plastic |

<Comparison of Sound Absorption Coefficient>

Next, comparison of the sound absorption coefficients was attempted between the vehicle package tray 100 obtained in Example 1 and conventional structures in the following Comparative Examples 3 and 4. The sound absorbing properties were respectively evaluated using a test piece of Example 1 and test pieces in the following Comparative Examples 3 and 4. For the sound absorbing properties, the sound absorption coefficients were measured at each frequency based on reverberant sound absorption coefficients prescribed in JIS A 1409.

Comparative Example 3

The vehicle package tray in Comparative Example 3 is an injection-molded article which is formed to have a plate thickness of 2.5 mm and a unit weight of 1400 g/m². As shown in FIG. 7, the sound absorption coefficient is less than 5%

4 than in Example 1. In addition, the maximum bending load in Comparative Example 3 was 39 N in the front-back direction of the vehicle, namely the longitudinal direction as shown in Table 1, which satisfied the range of the maximum bending load from 20 N to 200 N. The bending elastic gradient in Comparative Example 3 was 23 N/cm in the front-back direction of the vehicle, namely the longitudinal direction, which did not satisfy the range of the bending elastic gradient from 25 N/cm to 100 N/cm. The unit weight in Comparative Example 3 was 1400 g/m², which was heavier than that in Example 1 and did not satisfy the range of the unit weight from 400 g/m² to 1000 g/m². The maximum bending load in Comparative Example 4 was 80 N in the front-back direction of the vehicle, namely the longitudinal direction, which satisfied the range of the maximum bending load from 20 N to 200 N. The bending elastic gradient in Comparative Example 4 was 100 N/cm in the front-back direction of the vehicle, namely the longitudinal direction, which satisfied the range of the bending elastic gradient from 25 N/cm to 100 N/cm. The unit weight in Comparative Example 4 is 1400 g/m², which was heavier than that in Example 1 and did not satisfy the range of the unit weight from 400 g/m² to 1000 g/m².

The invention claimed is:

1. A vehicle package tray which is disposed in the back of a rear seat of a vehicle,
   wherein sheet-shaped fiber-reinforced materials, in which thermal hardening resin is impregnated, are overlapped on both surfaces of a semi-hard urethane foam layer,
   wherein a front surface material is overlapped on a surface of one fiber-reinforced material, in which the thermal hardening resin is impregnated, via a first adhesive film,
   wherein a back material is overlapped on a surface of the other fiber-reinforced material, in which the thermal hardening fiber-reinforced resin is impregnated, via a second adhesive film,
   wherein the laminated body obtains a sound absorbing performance by being formed into a three-dimensional shape by being pinched and fixed by a press die, heated, pressurized, and thereby fused,
   wherein an airflow blocking layer which blocks airflow is provided in any one of the first adhesive film and the second adhesive film,
   wherein the airflow blocking layer which is provided in any one of the first adhesive film and the second adhesive film is configured by a film made of synthetic resin with a melting point with which the film is not melted when pinched and fixed with the press die and subjected to heating and pressurizing processes,
   wherein adhesive layers configured by synthetic resin films with a melting point with which the synthetic resin films are melted when pinched and fixed by the press die and subjected to the heating and pressurizing processes are configured on both surfaces of the airflow blocking layer, and
   wherein the airflow blocking layer is interposed between the adhesive layers to form a multi-layered film.

2. The vehicle package tray according to claim 1, wherein the semi-hard urethane foam layer has CS hardness from 30 to 55, density from 0.025 g/cm³ to 0.035 g/cm³, a cell diameter from 0.2 mm to 0.5 mm, and an open-cell rate of not less than 90%.

3. The vehicle package tray according to claim 2, wherein the semi-hard urethane foam layer has a thickness from 2.0 mm to 10.0 mm before molding by heating and pressurizing.

4. The vehicle package tray according to claim 1, wherein the fiber-reinforced material has a unit weight from 100 g/m² to 250 g/m².

5. The vehicle package tray according to claim 1, wherein the airflow blocking layer is provided in the second adhesive film.

* * * * *